United States Patent
Bienaime et al.

(10) Patent No.: US 12,445,015 B2
(45) Date of Patent: Oct. 14, 2025

(54) ROTARY ELECTRICAL MACHINE AND STATOR ASSEMBLY FOR SUCH MACHINE

(71) Applicant: SKF Magnetic Mechatronics, Saint-Marcel (FR)

(72) Inventors: Francis Bienaime, Mont Saint-Aignan (FR); Eduardo Carrasco, Saint Etienne sous Bailleul (FR); Alain Boulier, Villegats (FR); Julien Boisson, Gaillon (FR)

(73) Assignee: SKF Magnetic Mechatronics, Saint-Marcel (FR)

( * ) Notice: Subject to any disclaimer, the term of this patent is extended or adjusted under 35 U.S.C. 154(b) by 0 days.

(21) Appl. No.: 17/900,174

(22) Filed: Aug. 31, 2022

(65) Prior Publication Data

US 2023/0072165 A1    Mar. 9, 2023

(30) Foreign Application Priority Data

Sep. 3, 2021    (EP) ..................................... 21194722

(51) Int. Cl.
*H02K 9/10* (2006.01)
*H02K 1/04* (2006.01)
*H02K 5/20* (2006.01)
*H02K 7/09* (2006.01)
*H02K 21/14* (2006.01)

(52) U.S. Cl.
CPC ................. *H02K 9/10* (2013.01); *H02K 1/04* (2013.01); *H02K 7/09* (2013.01); *H02K 21/14* (2013.01)

(58) Field of Classification Search
CPC .......... H02K 1/04; H02K 1/278; H02K 5/203; H02K 5/128; H02K 7/09; H02K 9/10; H02K 9/22; H02K 9/223; H02K 15/12; H02K 21/14
USPC ............................. 310/214, 43, 87, 88, 260
See application file for complete search history.

(56) References Cited

U.S. PATENT DOCUMENTS

| | | | |
|---|---|---|---|
| 3,283,187 A | 11/1966 | Schaefer | |
| 3,638,055 A | 1/1972 | Zimmermann | |
| 3,867,658 A * | 2/1975 | Dochterman | H02K 11/40 310/86 |
| 4,492,884 A * | 1/1985 | Asano | H02K 5/128 264/272.13 |
| 4,679,313 A | 7/1987 | Schultz et al. | |
| 4,729,160 A | 3/1988 | Brown | |
| 5,117,138 A | 5/1992 | Trian | |
| 5,233,248 A * | 8/1993 | Kawamura | H02K 5/136 310/156.28 |
| 5,541,460 A | 7/1996 | Dunfield et al. | |
| 6,069,421 A | 5/2000 | Smith | |
| 6,445,095 B1 * | 9/2002 | Liang | H02K 9/223 310/43 |

(Continued)

FOREIGN PATENT DOCUMENTS

| | | |
|---|---|---|
| CN | 102088214 B | 10/2012 |
| CN | 106505767 A | 3/2017 |

(Continued)

*Primary Examiner* — Michael Andrews
(74) *Attorney, Agent, or Firm* — GARCIA-ZAMOR INTELLECTUAL PROPERTY LAW, LLC; Ruy Garcia-Zamor

(57) ABSTRACT

A stator assembly for rotary electrical machine including a stator provided with windings. A sealing and cooling element is overmolded onto the stator.

20 Claims, 2 Drawing Sheets

(56) References Cited

U.S. PATENT DOCUMENTS

| | | | |
|---|---|---|---|
| 6,504,281 B1 | 1/2003 | Smith et al. | |
| 7,183,683 B2 | 2/2007 | Shafer et al. | |
| 9,018,817 B2 | 4/2015 | Bradley | |
| 10,075,041 B2* | 9/2018 | Claycomb | H02K 5/161 |
| 11,460,038 B2* | 10/2022 | Beck | F16C 32/0402 |
| 2003/0127924 A1 | 7/2003 | Van Dine | |
| 2005/0264113 A1 | 12/2005 | Suzuki et al. | |
| 2006/0226724 A1 | 10/2006 | Cullen et al. | |
| 2008/0218015 A1 | 9/2008 | Weeber | |
| 2010/0295395 A1 | 11/2010 | Baudelocque | |
| 2012/0055193 A1 | 3/2012 | Fukasaku | |
| 2014/0241865 A1* | 8/2014 | Arimatsu | H02K 5/203 29/889 |
| 2015/0357885 A1 | 12/2015 | Koiwai et al. | |
| 2016/0156251 A1 | 6/2016 | Sakurai | |
| 2018/0034341 A1 | 2/2018 | Petrucci | |
| 2020/0119606 A1 | 4/2020 | Murakami et al. | |
| 2020/0235640 A1* | 7/2020 | Sanderson | H02K 5/203 |
| 2020/0336031 A1 | 10/2020 | Takahashi | |

FOREIGN PATENT DOCUMENTS

| | | |
|---|---|---|
| CN | 107204684 A | 9/2017 |
| CN | 109863310 A | 6/2019 |
| EP | 2348614 A1 | 7/2011 |
| EP | 2584210 A1 | 4/2013 |
| EP | 1967286 B1 | 5/2014 |
| EP | 2097965 B1 | 5/2016 |
| EP | 3113339 A1 | 1/2017 |
| FR | 2087127 A5 | 12/1971 |
| GB | 2485149 B | 11/2014 |
| JP | S5996843 A | 6/1984 |
| JP | S59222057 A | 12/1984 |
| WO | 2017175534 A1 | 10/2017 |
| WO | 2018221008 A1 | 12/2018 |

* cited by examiner

ROTARY ELECTRICAL MACHINE AND STATOR ASSEMBLY FOR SUCH MACHINE

TECHNICAL FIELD OF THE INVENTION

The present invention generally relates to rotary electrical machine, notably hermetic rotary electrical machine and more precisely, rotary electrical machine cooled by explosive and/or aggressive gas. In particular, the invention concerns a stator assembly for rotary electrical machine and a rotary electrical machine including a stator assembly.

BACKGROUND OF THE INVENTION

A hermetic electrical machine typically includes an electrical motor arranged in a pressurized casing. A motor compressor unit for $H_2$ applications such as liquefaction of hydrogen is an example of hermetic electrical machine.

In such application, the presence of $H_2$ which is an aggressive and corrosive gas, in contact with internal parts leads to degradation of the electrical machine.

For other applications, internal parts of a motor compressor unit may be in contact with a mix of hydrocarbons, $CO_2$ gas, steam and/or liquid water and $H_2S$ gas which are also aggressive and corrosive gas.

Besides, a rotary electrical machine is generally equipped with cooling means for the motor. Cooling means for the motor usually include a water and glycol liquid mixture circulating in a jacket for cooling the external part of the stator, as well as processed gas circulating between the stator and the motor for cooling the internal part of the electrical machine.

The processed gas, only way to cool the rotor and the active magnetic bearings of the electrical machine, is typically $H_2$ or flare gas comprising hydrocarbons, carbon dioxide, and steam and liquid water. Directly coming from oil well, flare gas is aggressive and explosive and then incompatible with the electrical machine structure.

Composition and structure of former rotary electrical machine, whose cooling method is usually based on air and refrigerants, are not adapted for being subjected to aggressive and/or explosive gas. These conditions lead to the decrease in its lifetime.

SUMMARY OF THE INVENTION

Consequently, the present invention intends to overcome these disadvantages by providing a stator assembly compatible with a cooling method based on processed gas circulation, leading to a correct cooling of the electrical machine and preventing from its early deterioration.

One object of the invention is to provide a stator assembly for rotary electrical machine comprising a stator provided with windings.

Besides, stator assembly further comprises a sealing and cooling element overmolded onto the stator.

Preferably, the stator is provided with laminations, the overmolded element is overmolded onto the windings and the laminations.

Preferably, the overmolded element is made of a polymeric material with a polymerization temperature close to the operating temperature of rotary electrical machine.

Advantageously, the overmolded element can be made of an epoxy resin.

Preferably, the stator includes a protecting extending inside an inner surface of the windings and being made of an amagnetic material.

Advantageously, the protecting sleeve can be made at least partially of PEEK resin or epoxy resin.

Preferably, the protecting sleeve is made at least partially of a composite material reinforced with fibers, preferably carbon fibers.

The invention also concerns a rotary electrical machine comprising a casing delimiting a hermetic chamber, a stator assembly as described above mounted inside the hermetic chamber and comprising a stator provided with windings, and a rotor rotatably mounted within the stator and comprising a shaft and magnets supported by the shaft.

Preferably, the overmolded element is located in all the gaps of the hermetic chamber between the casing and the stator.

Preferably, the stator assembly comprises wires of coils, the overmolded element is located in all the gaps of the hermetic chamber between wires of the coils.

Advantageously, rotary electrical machine may comprise at least two flanges adapted to support active magnetic bearing modules on both lateral sides of the stator, the flanges being made of an amagnetic material.

Preferably, the flanges each comprises an inner wall having a shape adapted to conform with the shape of one end of the stator.

Preferably, the flanges are assembled to the rotary electrical machine with at least one Belleville washer.

Preferably, the rotor further comprises a protecting sleeve extending around an outer surface of the magnets and being made at least partially of PEEK resin.

Advantageously, the protecting sleeve can be made at least partially of a composite material based on a matrix of PEEK resin or epoxy resin.

Preferably, the protecting sleeve is made at least partially of a composite material based on a matrix of PEEK resin or epoxy resin reinforced with fibers, preferably carbon fibers.

Preferably, the rotor further comprises at least first and second rings supported by the shaft, the first ring being mounted at an end of the magnets and the second ring being mounted at an opposite end of the magnets.

Preferably, the first and second rings and the protecting sleeve define together a closed chamber inside which are located the magnets.

Preferably, the rotor further comprises at least two O-ring seals, each of the two O-ring seals being located between one of the two opposite ends of the protecting sleeve and one of the first and second rings.

BRIEF DESCRIPTION OF THE DRAWINGS

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. Other advantages and features of the invention will appear from the detailed description of embodiments of the invention, which are non-limiting examples, illustrated on the appended drawing of which.

DETAILED DESCRIPTION OF THE INVENTION

Figure 1:
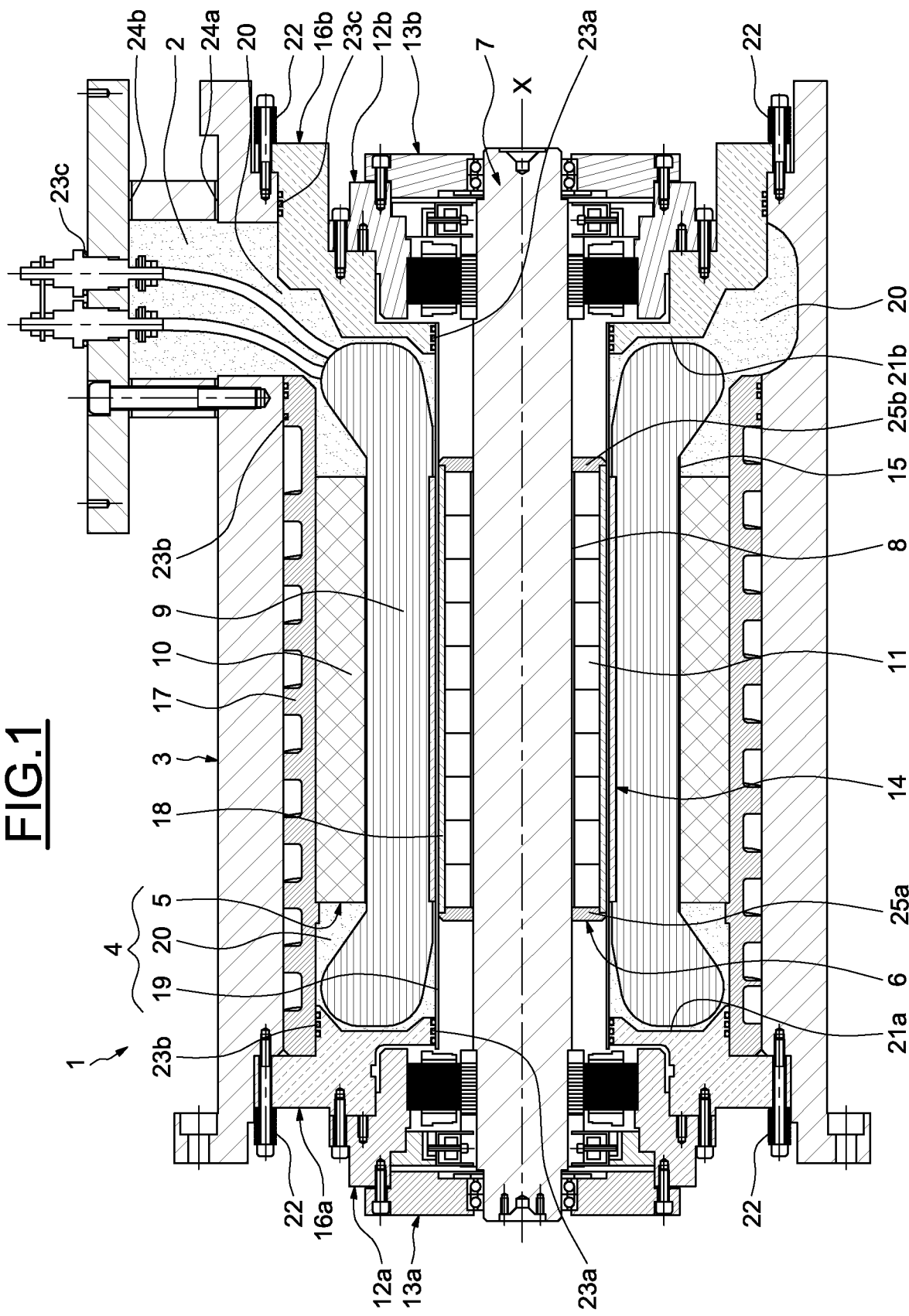
FIG. 1 is a sectional view of a hermetic rotary electrical machine, according to an embodiment of the invention.

Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. As shown in an embodiment illustrated in FIG. 1, a pressurized and hermetic rotary electrical machine 1 generally comprises a hermetic chamber 2 delimited by a casing 3 of the machine. The illustrated rotary electrical machine 1 is a motor compressor unit.

The rotary electrical machine 1 comprises a stator assembly 4 mounted inside the hermetic chamber 2 and comprising a stator 5 including windings 9.

The rotary electrical machine 1 also comprises a rotor 6 rotatably mounted within the stator 5, and comprising a shaft 7 extending about a central axis X. The rotor 6 includes magnets 11.

The rotary electrical machine 1 may comprise a housing 8 for the shaft 7 advantageously dedicated for the magnets 11 mounting and shrinkage.

The stator 5 has windings 9, advantageously copper wires, for conduction of currents and generation of induction and magnetic field, and laminations 10 for magnetic flux circulation to the rotor 6 and limitation of the magnetic losses generated by the induction variations. Electrical insulation between the laminations limits the eddy currents sources of the losses.

The rotor 6 comprises magnets 11, in particular permanent magnets, supported by the shaft for transmission of the torque, for magnetic interaction with the rotating magnetic field generated by the stator 5. The magnets 11 are stacked against each other in the axial and radial directions.

Besides, the illustrated rotary electrical machine 1 comprises active magnetic bearing (AMB) modules 12a and 12b, for radial guidance of the rotor 6 in normal operation. Preferably, cooling means include processed gas flowing in the hermetic chamber 2 in order to cool AMB modules 12a, 12b, rotor 6, and stator 5.

Back-up bearing modules 13a and 13b can also be provided in case of AMB modules failure. They also support the rotor 6 when AMB modules 12a, 12b are not activated.

The rotary electrical machine 1 preferably includes slot wedges 14 for limitation of magnetic losses and insulation paper 15 for electric insulation of wires, laminations and slot wedges 14.

Preferably, at least two flanges 16a and 16b are adapted to support the active magnetic bearing modules 12a, 12b on both lateral sides of the stator 5. A first flange 16a is mounted at an end of the stator 5 and a second flange 16b is mounted at an opposite end of the stator 5. The flanges 16a and 16b may also provide hermeticity of the hermetic chamber 2.

Besides, as represented in the FIG. 1, the cooling means may include a cooling device 17, in the hermetic chamber, comprising a cooling jacket, preferably located against the inner surface of the casing 3, and equipped with a spiral pipe for circulation of a water and glycol mixture for the dissipation of the heat produced by the stator 5, windings 9 and conducted by the other parts in contact such as the hermetic chamber and the flange (2, 16a).

The rotary electrical machine 1 comprises a sealing and cooling element 20 overmolded onto the stator 5, hereafter referred to as overmolded element 20, for protection of the stator 5 from aggressive and/or explosive gas and a correct cooling of the stator 5.

The overmolded element 20 is a thermal conductor which contributes to the cooling by transferring thermal fluxes.

In the illustrated example, the overmolded element 20 is overmolded onto the windings 9 and the laminations 10 and fills in, preferably, all the empty volumes of the windings 9 and the laminations 10.

Advantageously, overmolded element 20 may fill in all empty volumes of the stator 5.

The overmolded element 20 is preferably made of a polymeric material with a polymerization temperature close to the normal operating temperature of the rotary electrical machine 1 in order not to create thermoelastic stresses inside the stator 6. Normal operating temperature of the rotary electrical machine 1 refers to nominal operating conditions.

Advantageously, the overmolded element 20 has good thermal conductivity properties for an improved cooling of the stator assembly 4, good sealing properties for preventing the leakage of the processed gas externally to the rotary electrical machine 1.

The overmolded element 20 material has, preferably, a minimized volume and mass for manufacturing concern.

The overmolded element 20 can be made of a resin, for example an epoxy resin. For example, the epoxy resin can be a mixture of Araldite® XB2252 and Aradur® XB2253.

The overmolded element 20 may be located in all the gaps of the hermetic chamber between the casing 3 and the stator 5 and, preferably, between wires of coils of the stator assembly 4 for an improved sealing and cooling effect of the stator assembly 4, as well as an improved protection of the stator 5 from aggressive and/or explosive gas. The overmolded element 20 may be located in order to overmold and seal the rotary electrical machine 1 interfaces such as power and temperature probe terminals.

All the remaining space inside the stator 5 cavities are preferably filled by the overmolded element 20, such as around the windings 9, ends of the windings 9, inside slots the laminations 10, around feedthrough, etc.

Furthermore, the two flanges 16a and 16b adapted to support active magnetic bearing modules 12a, 12b on both lateral sides of the stator 5 are preferably made of an amagnetic material to avoid extra-heating due to eddy current losses. For example, the two flanges 16a and 16b can be made with non-magnetic austenitic stainless steel.

As shown in FIG. 1, the first and second flanges 16a, 16b and the protecting sleeve 19 of the stator 5 define together a closed chamber inside which are located the stator 5.

Besides, the two flanges 16a and 16b each may comprise an inner wall, respectively 21a and 21b, having a shape adapted to conform with the shape of one end of the stator 5. In this manner, the overmolded element 20 volume, the resin volume in the illustrated example, can be minimized and then adapted to the polymerization speed of the resin used.

Besides, the two flanges 16a and 16b may be assembled to the rotary electrical machine 1 with at least one Belleville washer 22. Belleville washers 22 allow the limitation of the tension of the screws used to fix the flanges 16a and 16b due to thermal differential expansion between the overmolded element 20 and the parts around such as the casing 3, the flanges 16a and 16b and the cooling device 17.

Preferably, the stator 5 also includes an annular protecting sleeve or tube 19 for the protection of windings 9 as well as, preferably, laminations 10, copper wires and their connections, from aggressive and/or explosive cooling gas. The protecting sleeve 19 of the stator 5 extends inside an inner surface of the windings 9 and is made of a non-magnetic material in order to not disturb the magnetic flux from the stator (lamination stack 10) to the rotor (permanent magnets 11). The inner surface of the windings 9 forms the bore of THE windings.

Advantageously, the protecting sleeve 19 of the stator 5 can be made, at least partially, of a polyetheretherketone (PEEK) resin or epoxy resin and, preferably, made of a composite material based on a matrix of PEEK resin or epoxy resin. Optionally, the composite material can be reinforced with fibers, for example carbon fibers. Fiber reference, ply orientations and width of the fibers can be adapted to the internal gas pressure level.

PEEK resin and epoxy resin are advantageously compatible with aggressive and explosive gas such as flare gas and particularly resistant.

Carbon fibers of a PEEK resin or epoxy resin based composite material improve the mechanical and thermal resistance of the protecting sleeve 19 of the stator 5 and its compatibility to aggressive and explosive gas. Non-magnetic carbon fiber composite material use allows to avoid any perturbance of the electrical machine magnetic circuits in order not to affect the performances of the rotary electrical machine 1.

For example, the protecting sleeve 19 of the stator 5 can be made of a composite material including PEEK resin, particularly compatible with aggressive and explosive gas, and TAIRYFIL® TC42S carbon fiber.

According to an embodiment, the rotary electrical machine 1 may not include a protecting sleeve 19 of the stator 5.

Preferably, the rotor 6 also comprises an annular protecting sleeve or hoop 18 for the protection of magnets 11 from aggressive and/or explosive cooling gas, such as flare gas or H$_2$. The hoop 18 of the rotor 6 extends around an outer surface of the magnets 11 and is made, at least partially, of a PEEK resin or epoxy resin.

According to an embodiment, the rotary electrical machine 1 may not include a hoop 18 of the rotor 6.

In the illustrated example, the protecting sleeve 18 comes radially into contact with the outer surface of the magnets 11.

The hoop 18 enables to maintain the permanent magnets 11 submitted to centrifugal effects onto the shaft 7 and, then to transmit the electromagnetic torque to the shaft 7.

The hoop 18 exerts a pre-stress on the magnets 11, so as to press them against the shaft housing 8 and the rotor shaft 7 so that they do not become detached under the centrifugal effect and so that they can transmit the electromagnetic torque in the permanent magnets 11 to the shaft 7.

As an alternative, a radial gap can be provided between the hoop 18 and the outer surface of the magnets 11.

Advantageously, the hoop 18 of the rotor 6 is made of a composite material based on a matrix of PEEK resin or epoxy resin, optionally with reinforced with fibers, for example carbon fibers. Fiber reference can be adapted to the maximal rotation speed of the rotor 6.

For example, the hoop 18 of the rotor 6 can be made of a composite material including PEEK resin and TAIRYFIL® TC42S carbon fiber.

The hoop 18 of the rotor 6 is preferably located in direct contact with the outer surface of the magnets 11 of the rotor 6.

A radial gap (not referenced) is provided between the protecting sleeve 19 of the stator 5 and the hoop 18 of the rotor 6.

Preferably, the rotary electrical machine 1 comprises seals, for example O-ring seals and flat seals.

O-ring seals 23a are located in order to ensure hermeticity during the overmolding of the overmolded element 20 and during operation, forming a barrier against processed gas penetration into the stator 5.

The hermeticity to processed gas provided by the protecting sleeve 19 of the stator 5 is particularly improved when combined with the O-ring 23a.

Besides, O-ring seals 23b are located to ensure hermeticity between the water and glycol mixture and the overmolded element 20.

O-ring seals 23c are located in order to ensure hermeticity between the overmolded element 20 and the rotary electrical machine 1 outside at the feedthrough.

Figure 2:
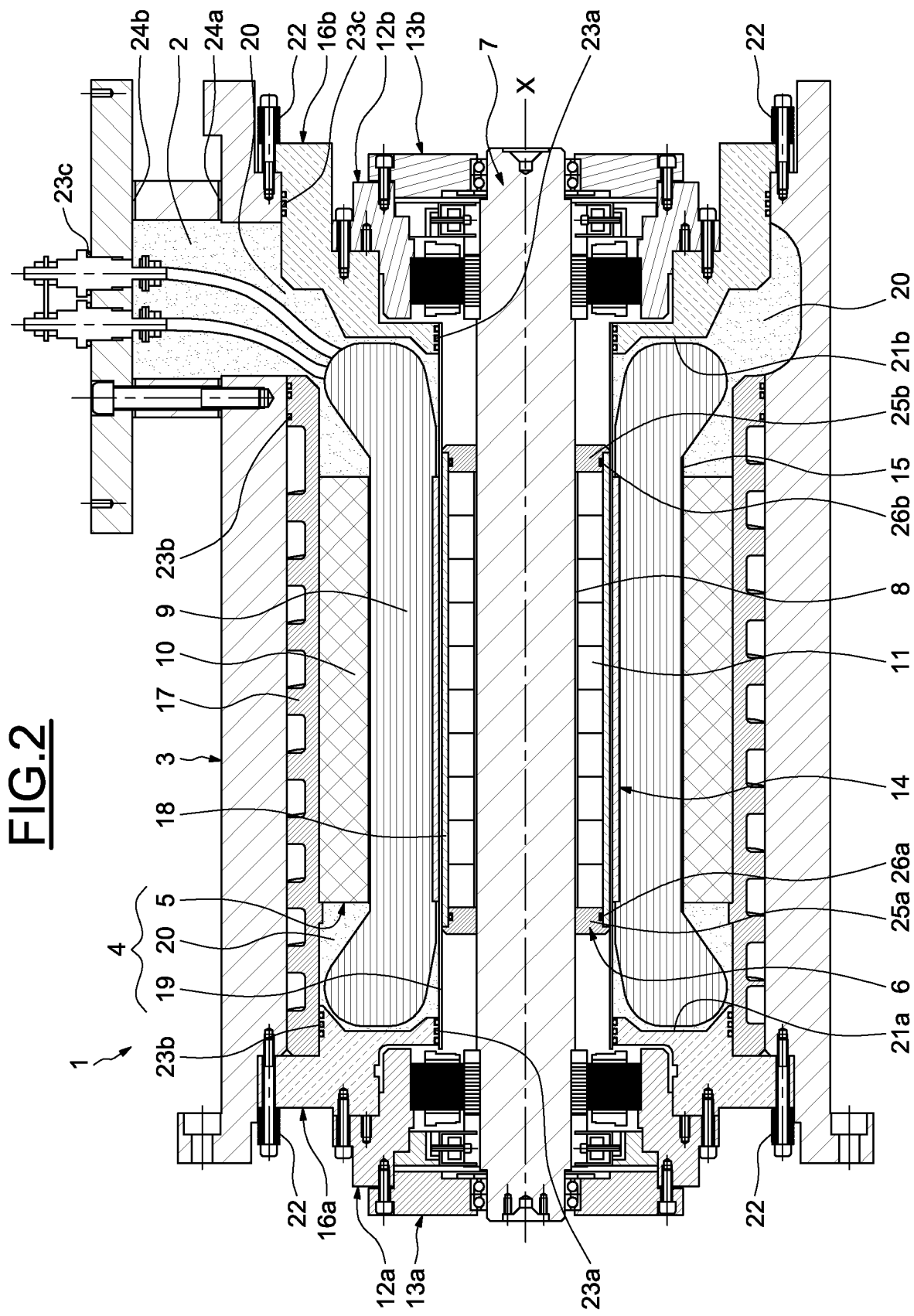
FIG. 2 is a sectional view of a hermetic rotary electrical machine, according to another embodiment of the invention.

As shown in the FIGS. 1 and 2, the rotary electrical machine 1 comprise a set of at least three O-ring seals per location in case of damage of one O-ring seal 23 during the overmolding of the overmolded element 20.

The two flanges 16a and 16b may comprise grooves for insertion of the O-ring seals 23a.

Flat seals 24a and 24b are located in order to ensure hermeticity between the overmolded element 20 and the rotary electrical machine 1 outside at a power junction box.

Besides, flat seals are located in order to ensure hermeticity between the overmolded element 20 and the rotary electrical machine 1 outside at a temperature probes junction box.

Preferably, the rotary electrical machine 1 also comprises first and second rings 25a, 25b for protection of the end surfaces of permanent magnets against aggressive and/or explosive gas.

The first and second rings 25a, 25b are supported by the shaft 7. The first ring 25a is mounted at an end of the magnets 11 and the second ring 25b is mounted at an opposite end of the magnets 11 to protect laterals end faces of the magnets 11. In other words, the first ring 25a is mounted at one axial end of the stack of magnets 11 and the second ring 25b is mounted at the opposite axial end of the stack. In the illustrated example, each of the first and second rings 25a axially abuts against one of the magnets 11. Alternatively, an axial gap may be provided between each of the first and second rings 25a and the associated magnet 11. Preferably, the axial gap is minimized.

Both opposite ends of the hoop 18 of the rotor 6 each radially comes into contact of one of the first and second rings 25a, 25b so that the first and second rings 25a, 25b and the hoop 18 of the rotor 6 define together a closed chamber inside which are located the magnets 11.

A radial gap (not referenced) is provided between the protecting sleeve 19 of the stator 5 and the first and second rings 25a, 25b of the rotor 6.

For example, the first and second rings 25a, 25b can be made of stainless steel.

Advantageously, the hoop 18 of the rotor 6 can be fixed to the first and second rings 25a, 25b and/or the magnets 11.

Preferably, permanent magnets 11 are glued onto the shaft housing 8. The hoop 18 is slipped around the magnets and the rings 25a and 25 b are brought together to form a subset. After that this subassembly is inserted by force, radial shrinkage of all the parts of the sub-assembly, by pushing axially on 1 ring 25. Then, the hoop 18 is "attached" to the rings 25a and 25b and the permanent magnets 11.

According to an alternative embodiment illustrated in FIG. 2, in which identical parts are given identical references, the rotary electrical machine 1 comprises two O-ring seals 26a and 26b in order to increase the hermeticity of the closed chamber defined by the first and second rings 25a, 25b and the hoop 18. Each of the two O-ring seals 26a and 26b is located between one of the two ends of the hoop 18 and one of the first and second rings 25a, 25b.

For example, each ring 25a, 25b includes a groove on its outer surface for receiving one of the two O-ring seals 26a, 26b.

According to another embodiment, the rotary electrical machine 1 may comprise more than two O-rings, for example two or three at each end of the rotor 6.

The overmolded element 20 allows the rotary electrical machine 1, in particular the permanent magnets, to be advantageously protected against the risk of corrosion by the processed gas, but also their explosion or leakage externally to the machine 1. Preferably, this protection against the risk of explosion and corrosion is improved by combination of the overmolded element 20 with the hoop 18 of the rotor 6 and/or the protecting sleeve 19 of the stator 5.

The invention claimed is:

1. A stator assembly that facilitates sealing and cooling, comprising:
    a stator located in a casing and provided with windings;
    a casing delimiting a hermetic chamber, comprising:
        a first section, wherein a hole within the first section at least partially defines axial sides of the hermetic chamber, and
        a second section that defines a top of the hermetic chamber;
    an overmolded element that is overmolded onto the stator;
    a plurality of laminations located on the stator;
    wherein the overmolded element is overmolded onto the windings and the laminations;
    wherein a portion of the overmolded element is coaxial with the first section of the casing, and the overmolded element partially extends radially outwardly further than the first section of the casing; and
    a cooling element axially overlapping the stator, the cooling element having spirals that define a spiral passageway therethrough, the spirals extending further axially outwardly than the laminations, the spiral passageway being therein configured to circulate a cooling fluid therethrough.

2. The stator assembly according to claim 1, wherein the overmolded element is made of a polymeric material with a polymerization temperature close to the operating temperature of rotary electrical machine.

3. The stator assembly according to claim 1, wherein the overmolded element is made of an epoxy resin.

4. The stator assembly according to claim 1, wherein the stator includes a protecting sleeve extending inside an inner surface of the windings and being made of an amagnetic material.

5. The stator assembly according to claim 4, wherein the protecting sleeve is made at least partially of PEEK resin or epoxy resin.

6. The stator assembly according to claim 4, wherein the protecting sleeve is made at least partially of a composite material reinforced with fibers, preferably carbon fibers.

7. A rotary electrical machine comprising:
    a casing delimiting a hermetic chamber, comprising:
        a first section, wherein a hole within the first section at least partially defines axial sides of the hermetic chamber, and
        a second section that defines a top of the hermetic chamber;
    a stator assembly for rotary electrical machine comprising:
    a stator provided with windings, the windings having first and second winding axial ends, and
    a cooling element abutting a portion of the casing, the cooling element axially overlapping the stator, the cooling element having spirals that define a spiral passageway therethrough, the spirals extending further axially outwardly than the laminations, the spiral passageway being configured to circulate a cooling fluid therethrough, and
    a sealing element and a cooling element overmolded onto the stator mounted inside the hermetic chamber, the cooling element abutting a portion of the casing, the cooling element axially overlapping the stator, the cooling element having a spiral passageway extending further axially outwardly than the laminations, therein configured to circulate a cooling fluid therethrough, wherein the sealing element forms and cooling element form an overmolded element, the overmolded element: (1) covers the first and second winding axial ends, (2) covers an axial end of the cooling element; (3) is coaxial with the first section of the casing; and (4) partially extends radially outwardly further than the first section of the casing; and
    a plurality of laminations located on the stator, wherein the overmolded element is overmolded onto the windings and the laminations, and
    a rotor rotatably mounted within the stator and comprising a shaft and magnets supported by the shaft.

8. The rotary electrical machine according to claim 7, wherein the overmolded element is located in the gaps of the hermetic chamber between the casing and the stator.

9. The rotary electrical machine according to claim 7, wherein the stator assembly comprises wires of coils, the overmolded element is located in all the gaps of the hermetic chamber between wires of the coils.

10. The rotary electrical machine according to claim 7, further comprising at least two flanges adapted to support active magnetic bearing modules on both lateral sides of the stator, the flanges being made of an amagnetic material.

11. The rotary electrical machine according to claim 10, wherein the flanges each comprise an inner wall having a shape adapted to conform with the shape of one end of the stator.

12. The rotary electrical machine according to claim 7, wherein the rotor further comprises a protecting sleeve extending around an outer surface of the magnets and being made at least partially of PEEK resin or epoxy resin.

13. The rotary electrical machine according to claim 7, wherein the rotor further comprises at least first and second rings supported by the shaft, the first ring being mounted at an end of the magnets and the second ring being mounted at an opposite end of the magnets.

14. The rotary electrical machine according to claim 13, wherein the first and second rings and the protecting sleeve of the rotor define together a closed chamber inside which are located the magnets.

15. A rotary electrical machine comprising:
   a casing delimiting a hermetic chamber, comprising:
      a first section, wherein a hole within the first section at least partially defines axial sides of the hermetic chamber, and
      a second section that defines a top of the hermetic chamber;
   a stator assembly for rotary electrical machine comprising:
   a stator provided with windings, the windings having first and second winding axial ends, and
   a cooling element abutting a portion of the casing, the cooling element axially overlapping the stator, the cooling element having spirals that define a spiral passageway therethrough, the spirals extending further axially outwardly than the laminations, the spiral passageway being configured to circulate a cooling fluid therethrough, and
   a sealing element and a cooling element overmolded onto the stator mounted inside the hermetic chamber, the cooling element abutting a portion of the casing, the cooling element axially overlapping the stator, the cooling element having a spiral passageway extending further axially outwardly than the laminations, therein configured to circulate a cooling fluid therethrough, wherein the sealing element forms and cooling element form an overmolded element, the overmolded element:
      (1) covers the first and second winding axial ends, (2) covers an axial end of the cooling element; (3) is coaxial with the first section of the casing; and (4) partially extends radially outwardly further than the first section of the casing; and
   a plurality of laminations located on the stator, wherein the overmolded element is overmolded onto the windings and the laminations, and
   a rotor rotatably mounted within the stator and comprising a shaft and magnets supported by the shaft.

16. The rotary electrical machine according to claim 15, further comprising at least two flanges adapted to support active magnetic bearing modules on both lateral sides of the stator, the flanges being made of an amagnetic material.

17. The rotary electrical machine according to claim 15, wherein the flanges each comprise an inner wall having a shape adapted to conform with the shape of one end of the stator.

18. The rotary electrical machine according to claim 15, wherein the rotor further comprises a protecting sleeve extending around an outer surface of the magnets and being made at least partially of PEEK resin or epoxy resin.

19. The rotary electrical machine according to claim 15, wherein the rotor further comprises at least first and second rings supported by the shaft, the first ring being mounted at an end of the magnets and the second ring being mounted at an opposite end of the magnets.

20. The rotary electrical machine according to claim 19, wherein the first and second rings and the protecting sleeve of the rotor define together a closed chamber inside which are located the magnets.

\* \* \* \* \*